(12) United States Patent
Kester et al.

(10) Patent No.: US 10,634,437 B2
(45) Date of Patent: Apr. 28, 2020

(54) HEAT EXCHANGER COIL PROTOTYPING SYSTEM

(71) Applicant: Johnson Controls Technology Company, Milwaukee, WI (US)

(72) Inventors: Douglas A. Kester, York, PA (US); Nicholas P. Mislak, Bel Air, MD (US)

(73) Assignee: Johnson Controls Technology Company, Auburn Hills, MI (US)

( * ) Notice: Subject to any disclaimer, the term of this patent is extended or adjusted under 35 U.S.C. 154(b) by 86 days.

(21) Appl. No.: 15/716,193

(22) Filed: Sep. 26, 2017

(65) Prior Publication Data

US 2018/0106559 A1     Apr. 19, 2018

Related U.S. Application Data

(60) Provisional application No. 62/407,932, filed on Oct. 13, 2016.

(51) Int. Cl.
| *F28F 9/26* | (2006.01) |
| *G01M 99/00* | (2011.01) |
| *F28D 1/047* | (2006.01) |
| *F28D 7/08* | (2006.01) |
| *F28D 21/00* | (2006.01) |

(52) U.S. Cl.
CPC .............. *F28F 9/26* (2013.01); *F28D 1/0477* (2013.01); *F28F 9/262* (2013.01); *G01M 99/008* (2013.01); *F28D 7/085* (2013.01); *F28D 2021/0068* (2013.01); *F28F 2200/00* (2013.01)

(58) Field of Classification Search
CPC .......... F28F 9/26; F28F 9/262; F28F 2200/00; F28D 1/0477; F28D 7/085; F28D 2021/0068; G01M 99/008
See application file for complete search history.

(56) References Cited

U.S. PATENT DOCUMENTS

| 4,458,719 | A | | 7/1984 | Strybel |
| 5,419,042 | A | | 5/1995 | Kado |
| 5,529,116 | A | * | 6/1996 | Sasaki ................... F28D 1/0417 123/41.51 |
| 5,649,361 | A | | 7/1997 | Hindle et al. |
| 6,848,670 | B2 | | 2/2005 | Haunhorst et al. |
| 6,938,651 | B1 | | 9/2005 | Carter et al. |

(Continued)

FOREIGN PATENT DOCUMENTS

GB          2504082 A       1/2014

*Primary Examiner* — Nathaniel T Woodward
(74) *Attorney, Agent, or Firm* — Fletcher Yoder, P.C.

(57) ABSTRACT

The present disclosure relates to a heat exchanger coil prototyping system. The heat exchanger coil prototyping system includes a heat exchanger coil with a first conduit and a second conduit that carry a refrigerant. The first conduit includes a first open end and a second open end. The second conduit includes a third open end and a fourth open end. A fin couples to the first conduit and the second conduit. A quick release connector system also couples to the first and second conduits. The quick release connector system includes a first quick release connector assembly that couples to the first open end of the first conduit and to the third open end of the second conduit to route the refrigerant between the first and second conduits. A second quick release connector assembly couples to the second conduit.

21 Claims, 10 Drawing Sheets

(56) References Cited

U.S. PATENT DOCUMENTS

| | | | |
|---|---|---|---|
| 7,942,020 B2* | 5/2011 | Knight | F25B 39/00 |
| | | | 62/519 |
| 9,007,771 B2 | 4/2015 | Agostini | |
| 2011/0056668 A1* | 3/2011 | Taras | F28D 1/0478 |
| | | | 165/174 |
| 2014/0339818 A1 | 11/2014 | Bottura | |
| 2018/0003444 A1* | 1/2018 | Markussen | F28D 7/12 |

* cited by examiner

HEAT EXCHANGER COIL PROTOTYPING SYSTEM

CROSS-REFERENCE TO RELATED APPLICATION

This application is a Non-Provisional Application claiming priority to U.S. Provisional Application No. 62/407,932, entitled "PUSH-IN CONNECTION CONSTRUCTION FOR HEAT EXCHANGER PROTOTYPING," filed Oct. 13, 2016, which is hereby incorporated by reference in its entirety for all purposes.

BACKGROUND

The invention relates generally to heat exchangers in vapor compression systems.

Heat exchangers are used in heating, ventilation, and air conditioning (HVAC) systems to exchange energy between fluids. Typical HVAC systems have two heat exchangers commonly referred to as an evaporator coil and a condenser coil. The evaporator coil and the condenser coil facilitate heat transfer between air surrounding the coils and a refrigerant that flows through the coils. For example, as air passes over the evaporator coil, the air cools as it loses energy to the refrigerant passing through the evaporator coil. In contrast, the condenser facilitates the discharge of heat from the refrigerant to the surrounding air. Unfortunately, optimizing flow paths through the coils to increase heat transfer may be a difficult and time-consuming process.

SUMMARY

The present disclosure relates to a heat exchanger coil prototyping system. The heat exchanger coil prototyping system includes a heat exchanger coil with a first conduit and a second conduit that carry a refrigerant. The first conduit includes a first open end and a second open end. The second conduit includes a third open end and a fourth open end. A fin couples to the first conduit and the second conduit. A quick release connector system also couples to the first and second conduits. The quick release connector system includes a first quick release connector assembly that couples to the first open end of the first conduit and to the third open end of the second conduit to route the refrigerant between the first and second conduits. A second quick release connector assembly couples to the second conduit.

The present disclosure also relates to a heat exchanger coil prototyping system. The heat exchanger coil prototyping system includes a heat exchanger coil with a first conduit and a second conduit that carry a refrigerant. The first conduit includes a first end with a first quick release connector, and the second conduit includes a second quick release connector. A third conduit is removably coupled to the first quick release connector and the second quick release connector to create a refrigerant flow path between the first conduit and the second conduit. A fin couples to the first conduit and the second conduit.

The present disclosure also relates to a method of prototyping a heat exchanger coil. The method includes providing a heat exchanger coil. The heat exchanger coil includes a first conduit and a second conduit, with the first and second conduits coupled to a fin. The method couples a first quick release connector assembly to a first end of the first conduit of the heat exchanger coil. The method also couples the first quick release connector assembly to a second end of the second conduit of the heat exchanger coil, and couples a second quick release connector assembly to the first conduit of the heat exchanger coil.

DETAILED DESCRIPTION

Embodiments of the present disclosure include a heat exchanger coil prototyping system that facilitates heat transfer optimization in a heat exchanger coil. Heat exchanger coils include a plurality of conduits that fluidly couple together to form one or more flow paths. The conduits typically extend through one or more fins that facilitate heat transfer between a refrigerant flowing through the conduits and air passing over the fins.

However, before mass-producing the heat exchanger coil, various testing is performed to optimize the flow path(s) through the heat exchanger coil to increase heat transfer efficiency. Maldistribution of the refrigerant in the heat exchanger coil and/or maldistribution of airflow over the heat exchanger coil may affect heat transfer between the refrigerant and the surrounding air. Accordingly, during testing the conduits may be connected to each other in different ways to determine one or more optimal pathways that increase heat transfer efficiency of the heat exchanger coil. The conduits are connected together using connectors that are typically brazed and/or welded to the conduits to form a fluid tight seal. The process of brazing and/or welding the connectors to the conduits to test different pathways is a time consuming and difficult process.

The heat exchanger coil prototyping system includes a quick release connector system with one or more quick release assemblies that facilitate coupling and decoupling to and from the conduits of the heat exchanger coil without brazing or welding. This enables rapid testing of different pathways through the heat exchanger coil by coupling conduits in different ways. The heat exchanger coil prototyping system therefore facilitates heat transfer optimization of the heat exchanger coil.

Figure 1:
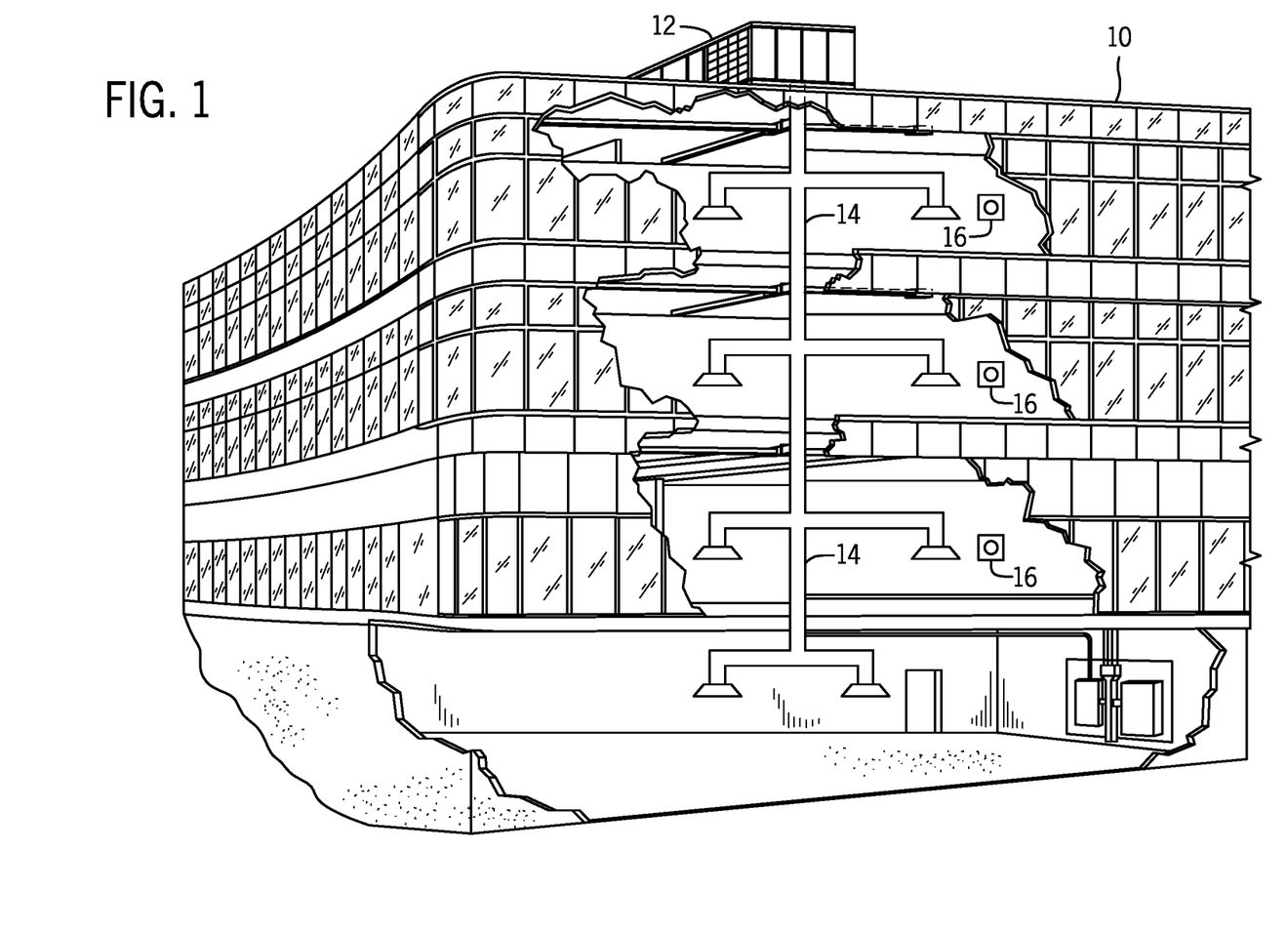
FIG. 1 is a perspective view of an embodiment of a building that may utilize a heating, ventilation, and air conditioning (HVAC) system in a commercial setting, in accordance with an aspect of the present disclosure.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air-cooled device that implements a refrigeration cycle to provide conditioned air to the building 10. Specifically, the HVAC unit 12 may include one or more heat exchangers across which an airflow is passed to condition the airflow before the airflow is supplied to the building. In the illustrated embodiment, the HVAC unit 12 is a rooftop unit (RTU) that conditions a supply air stream, such as environmental air and/or a return airflow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
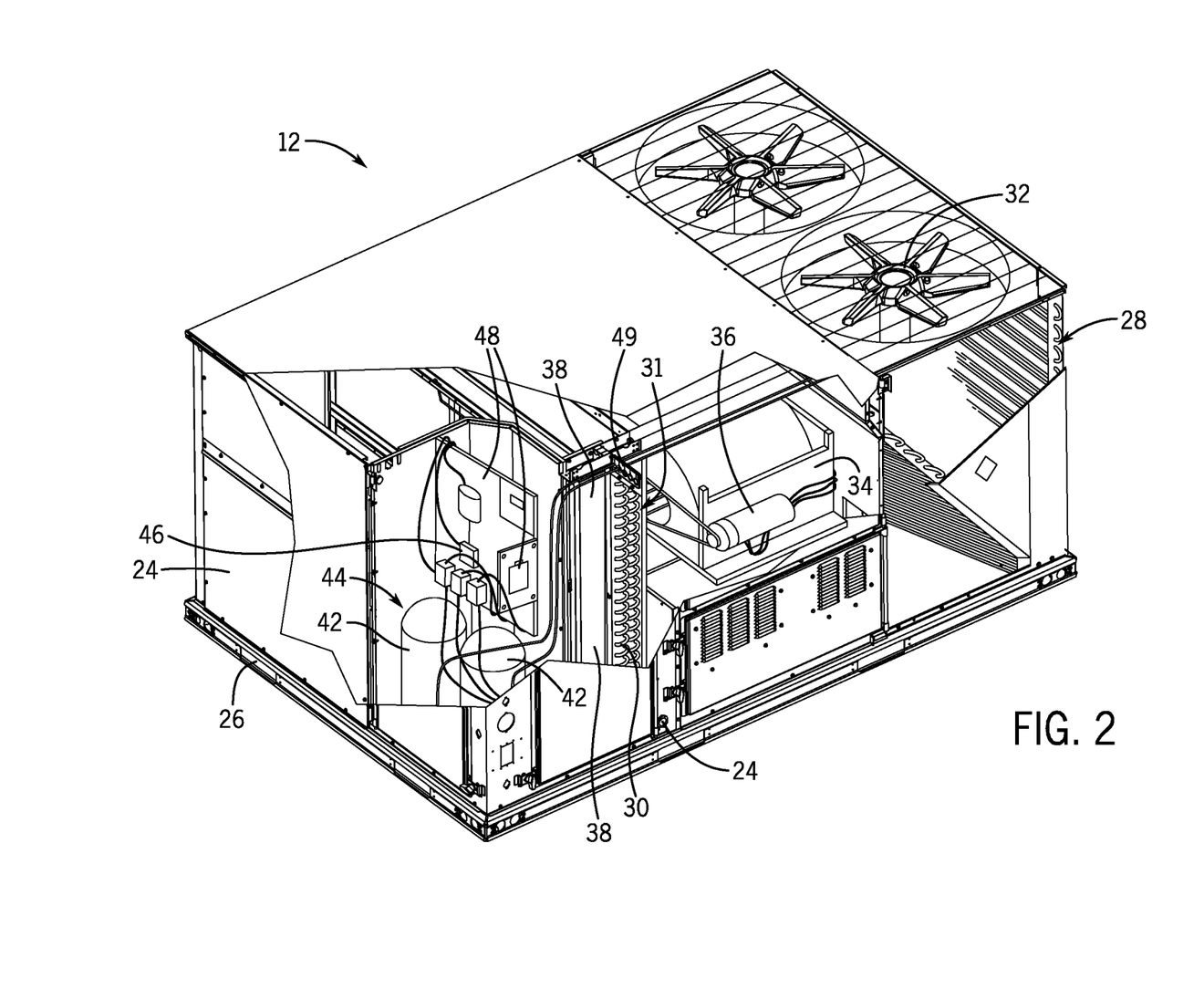
FIG. 2 is a perspective view of an embodiment of an HVAC unit of the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant (for example, R-410A, steam, or water) through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned airflows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive him arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms (one or more being referred to herein separately or collectively as the control device 16). The control circuitry may be configured to control operation of the equipment, provide alarms, and monitor safety switches. Wiring 49 may connect the control board 48 and the terminal block 46 to the equipment of the HVAC unit 12.

Figure 3:
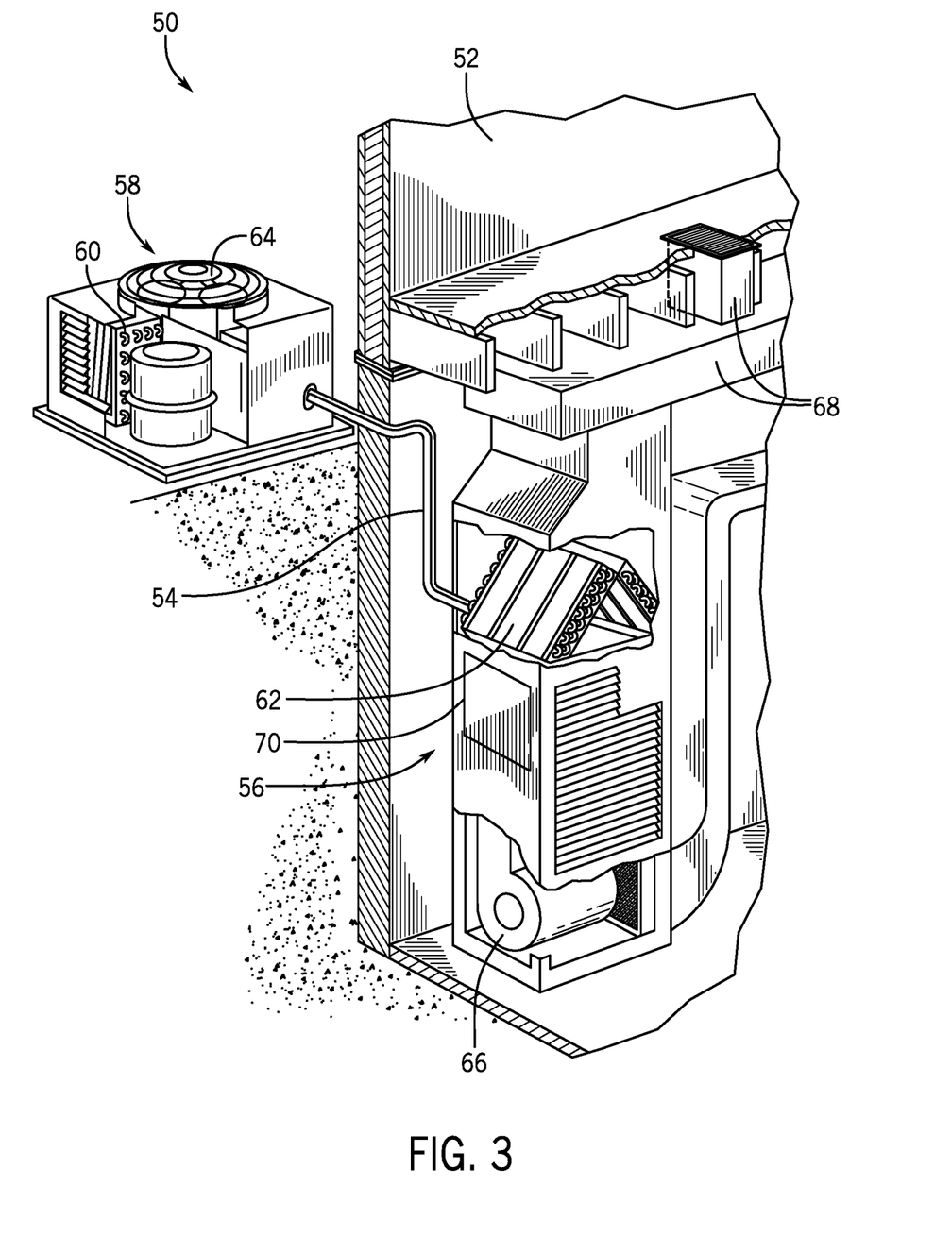
FIG. 3 is a perspective view of an embodiment of a residential, split HVAC system that includes an indoor HVAC unit and an outdoor HVAC unit, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device, not shown) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat (plus a small amount), the residential heating and cooling system 50 may become operative to refrigerate additional air for circulation through the residence 52. When the temperature reaches the set point (minus a small amount), the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger (that is, separate from heat exchanger 62), such that air directed by the blower 66 passes over the tubes or pipes and extracts heat from the combustion products. The heated air may then be routed from the furnace system 70 to the ductwork 68 for heating the residence 52.

Figure 4:
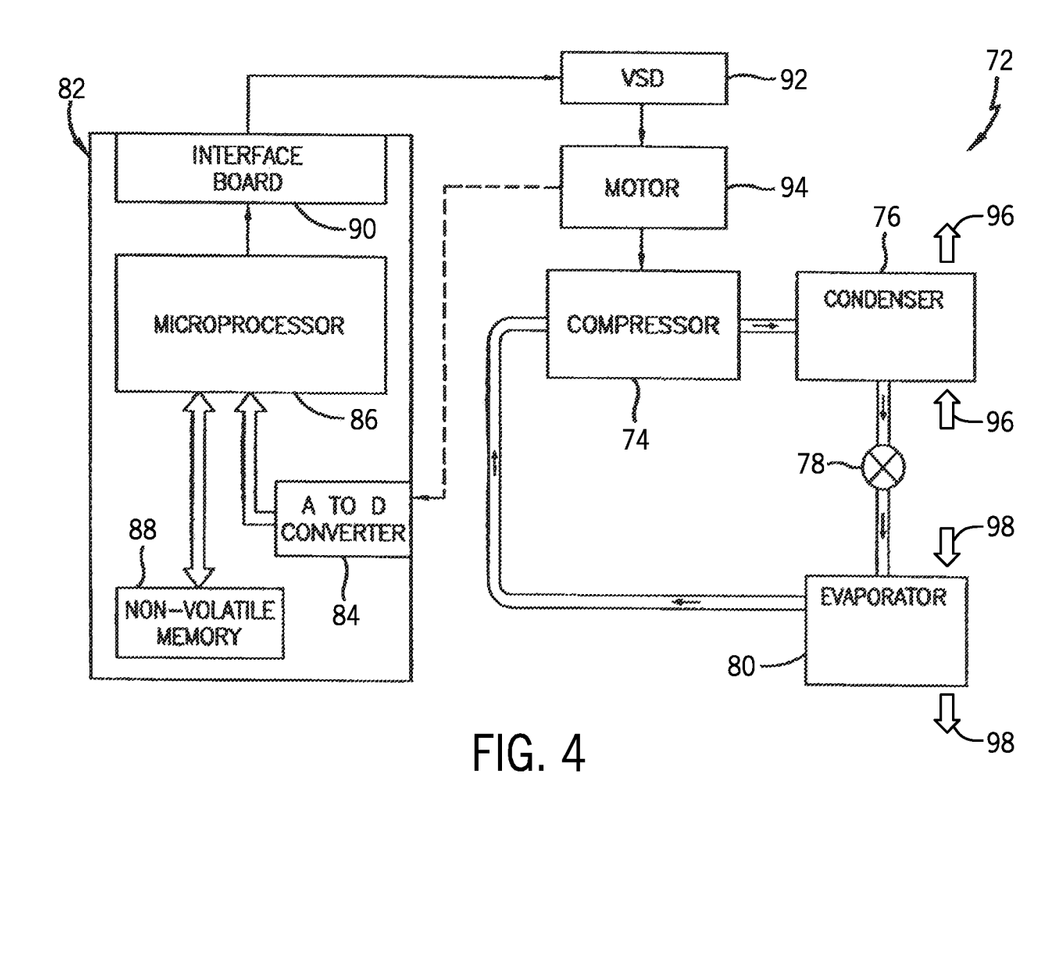
FIG. 4 is a schematic of an embodiment of an HVAC system, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
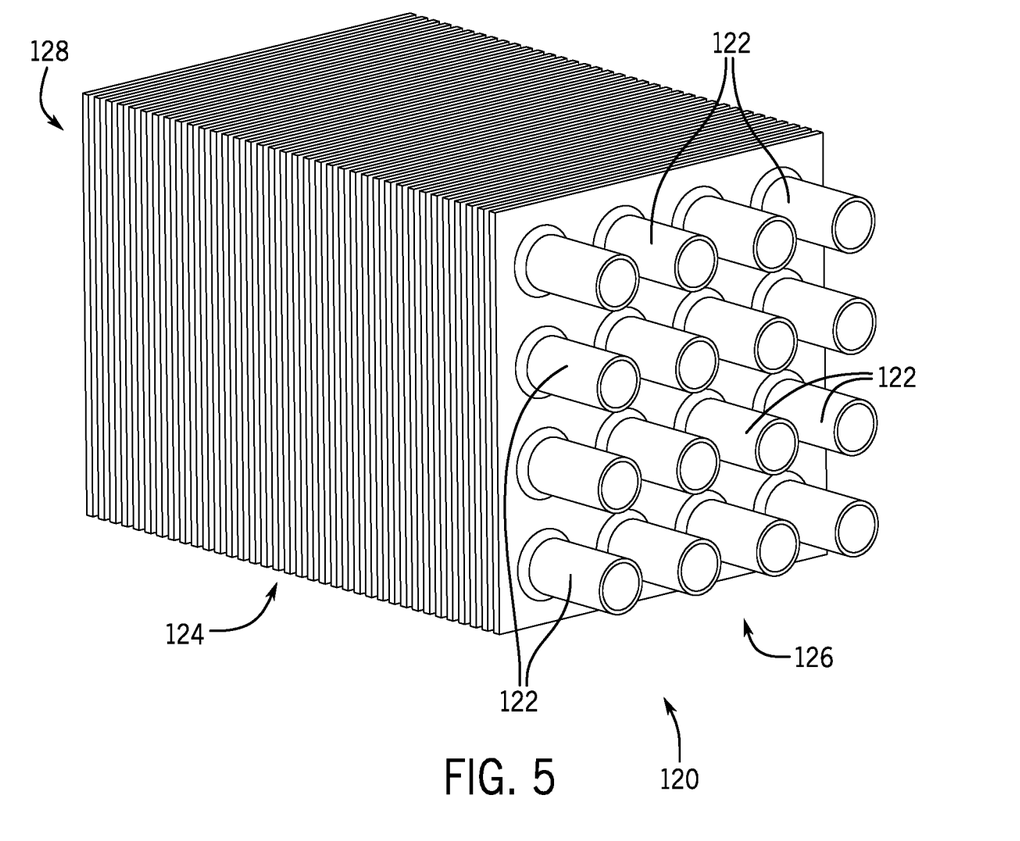
FIG. 5 is a perspective view of an embodiment of a heat exchanger coil without connector assemblies, in accordance with an aspect of the present disclosure.

FIG. 5 is a perspective view of an embodiment of a heat exchanger coil, such as an evaporator coil or condenser coil. As illustrated, the heat exchanger coil 120 includes a plurality of conduits 122. The conduits 122 extend through one or more fins 124 that facilitate heat transfer between a refrigerant flowing through the conduits 122 and air passing over the fins 124.

In FIG. 5, the conduits 122 do not fluidly couple to one another and therefore each define opposing open ends 126, 128. During the manufacturing process, connectors couple to opposing ends 126, 128 to form one or more flow paths through the heat exchanger coil 120. That is, the conduits 122 fluidly couple together with connectors to enable refrigerant to circulate within the heat exchanger coil 120. However, before the heat exchanger coil 120 is mass-produced, various flow path(s) are tested to optimize heat transfer efficiency. Maldistribution of the refrigerant in the heat exchanger coil 120 and/or maldistribution of airflow over the heat exchanger coil 120 may affect heat transfer between the refrigerant and the surrounding air. The conduits 122 may therefore be fluidly coupled to each other in specific ways or configurations that optimize heat transfer.

Figure 6:
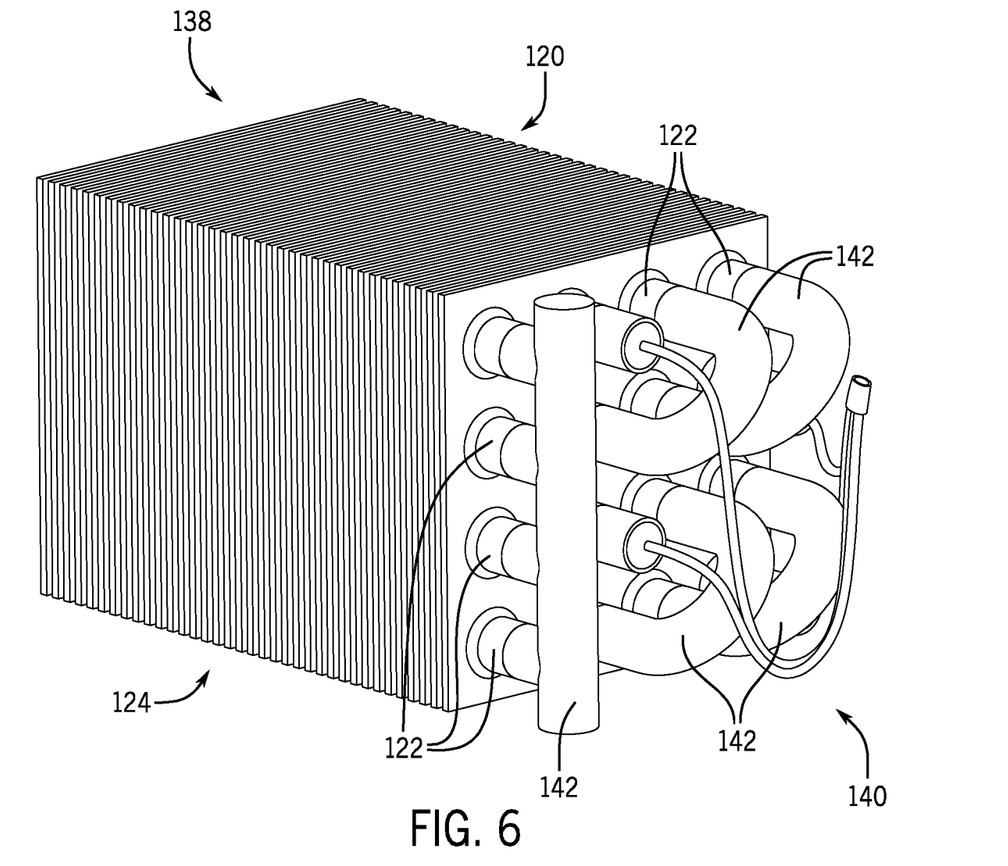
FIG. 6 is a perspective view of an embodiment of a heat exchanger coil prototyping system, in accordance with an aspect of the present disclosure.

FIG. 6 is a perspective view of an embodiment of a heat exchanger coil prototyping system 138 with a quick release connector system 140 coupled to a heat exchanger coil 120. It should be understood that the term "quick release," as used in this application, excludes the joining techniques of brazing and welding. The quick release connector system 140 includes a plurality of quick release connector assemblies 142 that enable an operator to quickly couple the conduits 122 together to form a flow path(s) through the heat exchanger coil 120. The quick release connector assemblies 142 form fluid tight seals via friction and/or interference fit connections. By enabling a quick connect and disconnect from the conduits 122, the quick release connector assemblies 142 enable rapid testing of different flow paths through the heat exchanger coil 120 and thus facilitate heat transfer optimization of the heat exchanger coil 120 before mass production.

Figure 7:
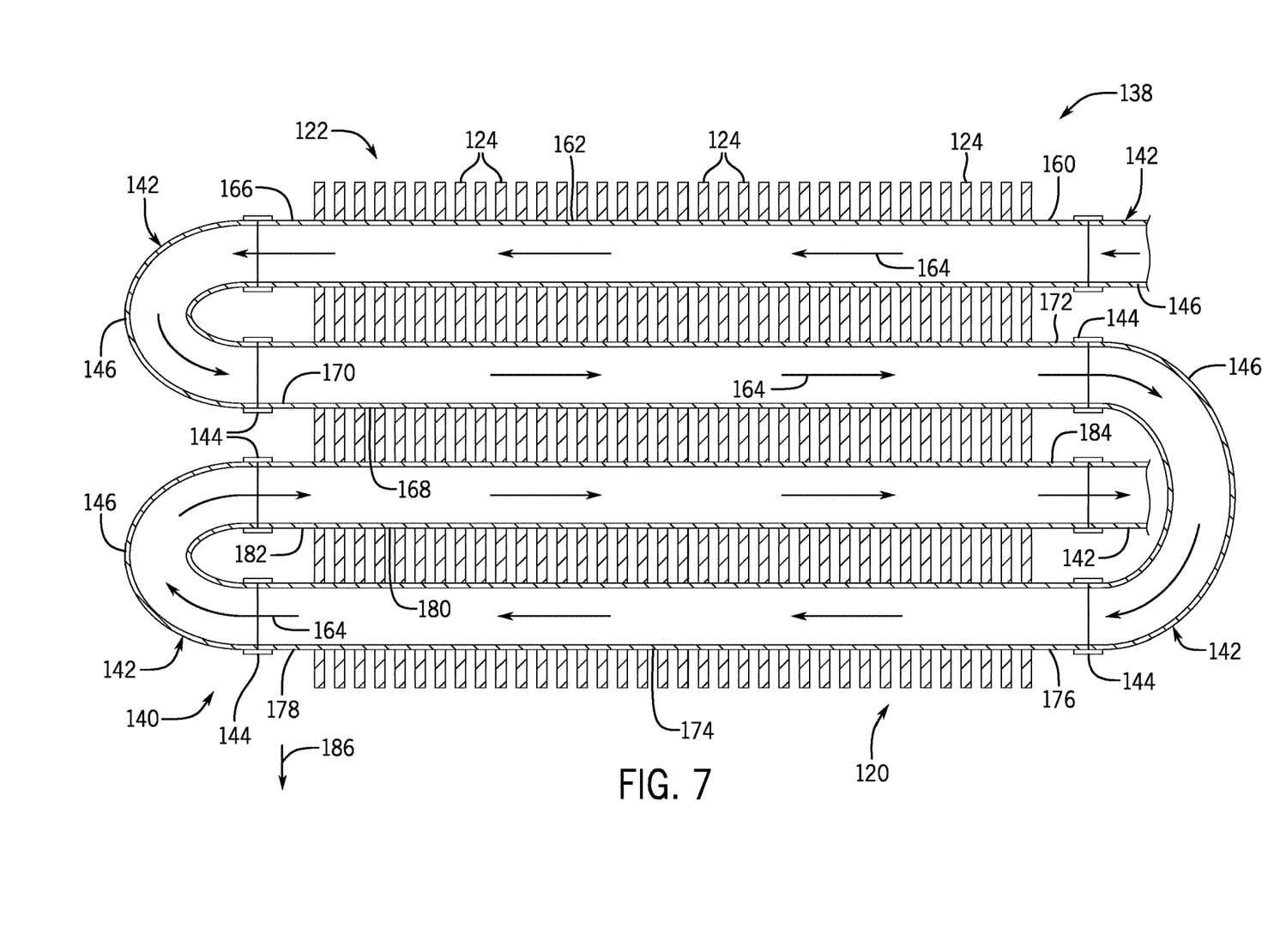
FIG. 7 is a cross-sectional view of an embodiment a heat exchanger coil prototyping system, in accordance with an aspect of the present disclosure.

FIG. 7 is a cross-sectional view of an embodiment of a heat exchanger coil prototyping system 138 with a quick release connector system 140 coupled to a heat exchanger coil 120. The quick release connector system 140 includes a plurality of quick release connector assemblies 142. The quick release connector assemblies 142 fluidly couple the conduits 122 together to form one or more flow paths through the heat exchanger coil 120. As explained above, the quick release connector assemblies 142 form fluid tight seal through friction and/or interference fit connections.

As illustrated, the quick release connector assemblies 142 may include quick release connectors 144, such as male and female connectors, that couple to hoses/conduits 146, which may be U-shaped hoses/conduits, straight hoses/conduits, etc. This enables the quick release connectors 144 and hoses/conduits 146 to quickly couple and uncouple from conduits 122 in the coil 120 for rapid testing of multiple configurations of flow paths through the coil 120. In some embodiments, the quick release connectors 144 may be instead coupled to the conduits 122, thereby enabling the hoses/conduits 146 to be quickly coupled and uncoupled from the quick release connectors 144 to form different flow paths through the coil 120.

As illustrated, a quick release connector assembly 142 may couple to an inlet 160 of a first conduit 162, thereby enabling refrigerant to flow into the heat exchanger coil 120. The first conduit 162 guides the refrigerant 164 from the inlet 160 to an outlet 166, where another quick release connector assembly 142 fluidly couples the first conduit 162 to a second conduit 168. The refrigerant 164 then flows from the inlet 170 of the second conduit 168 to an outlet 172. Refrigerant is then directed through another quick release connector assembly 142 to a fourth conduit 174. The refrigerant 154 flows through the fourth conduit 174 from an inlet 176 to an outlet 178. The refrigerant 164 is guided through another quick release connector assembly 142 into a third conduit 180. The refrigerant flows from the inlet 182 of the third conduit 180 until it exits the heat exchanger coil 120 through an outlet 184.

In FIG. 7, the flow path through the heat exchanger coil 120 does not flow sequentially through the conduits 122 in axial direction 186. Instead, the refrigerant flows from the second conduit 168 to the fourth conduit 174 before returning to the third conduit 180. In order to change the flow path, the quick release connector assemblies 142 are disconnected and then reconnected to create additional flow paths through the heat exchanger coil 120. The heat exchanger coil 120 may then be re-tested to determine the heat transfer efficiency with the new flow path through the heat exchanger coil 120. In this way, the heat exchanger coil 120 may be rapidly tested to optimize heat transfer. Without the quick release connector assemblies 142 of the quick release connector system 140 each connection between the various conduits 122 would have to be brazed and then unbrazed and/or welded and then cut in order to change the flow path through the heat exchanger coil 120 during testing. This process is time consuming and difficult.

Figure 8:
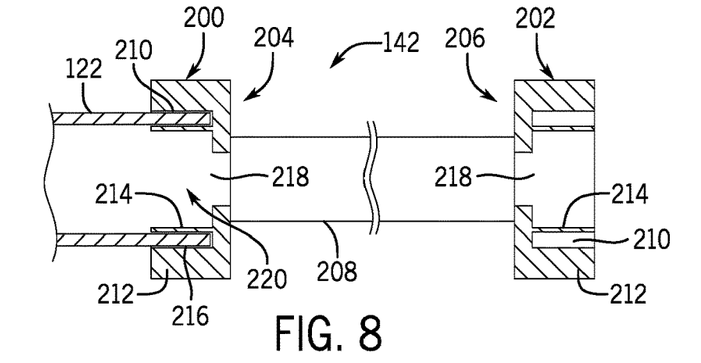
FIG. 8 is a cross-sectional view of an embodiment of a connector assembly, in accordance with an aspect of the present disclosure.

FIG. 8 is a cross-sectional view of an embodiment of the quick release connector assembly 142. The quick release connector assembly 142 includes a first female connector 200, which may be a quick release connector, and a second female connector 202, which may also be a quick release connector, that couple to opposing ends 204, 206 of the conduit 208. The female connectors 200, 202 facilitate a quick connection and release from conduits 122 of the heat exchanger coil 120. In some embodiments, the quick release connectors form a fluid tight seal via a friction and/or interference fit connection. The female connectors 200, 202 define an annular space 210 between an outer wall 212 and an inner wall 214. It is in this annular space 210 that the female connectors 200, 202 are able to receive and couple to an end 216 of a conduit 122. When connected, the female connector 200 forms a fluid tight seal with the conduit 122. This enables refrigerant to flow through an aperture 218 in the female connector 200, 202 and through the conduit 208. While the female connectors 200, 202 illustrate a counterbore 220, in some embodiments there may not be a counterbore 220. Instead, the wall 214 may form the aperture 218 through the female connectors 200, 202.

The conduit 208 may be made from a flexible material (e.g., rubber, plastic) capable of handling a refrigerant used in the heat exchanger coil 120. In some embodiments, the conduit 208 may be made from the same material as the conduits 122 (e.g., copper, copper alloys, etc.) in order to better approximate actual operating conditions of the heat exchanger coil 120.

While female connectors are illustrated in FIG. 8 and in FIGS. 9-11 discussed below, it should be understood that some embodiments may use male connectors instead of female connectors or a combination of male and female connectors (e.g., one end may include a male connector and the opposite end may include a female connector).

Figure 9:
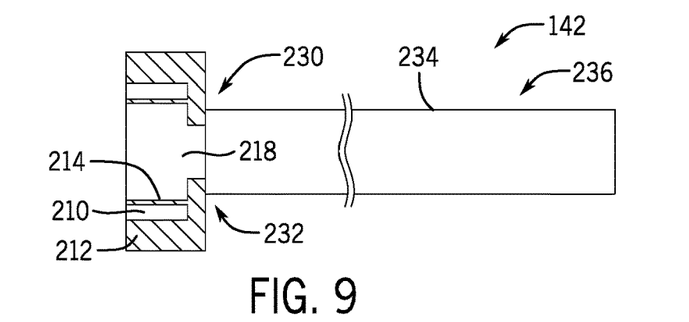
FIG. 9 is a cross-sectional view of an embodiment of a connector assembly, in accordance with an aspect of the present disclosure.

FIG. 9 is a cross-sectional view of an embodiment of the quick release connector assembly 142. As illustrated, the quick release connector assembly 142 includes a female connector 230, which may be a quick release connector, coupled to a first end 232 of a conduit 234 and not to the second end 236. This enables the second end 236 of the quick release connector assembly 142 to connect to another female connector. For example, the second end 236 may couple to a female connector on a manifold, a conduit 122, etc. Similar to the discussion above, the conduit 234 may be made from a flexible material (e.g., rubber, plastic) capable of handling a refrigerant used in the heat exchanger coil 120. In some embodiments, the conduit 234 may include the same material as the conduits 122 (e.g., copper, copper alloys, etc.) in order to better approximate actual operating conditions of the heat exchanger coil 120.

Figure 10:
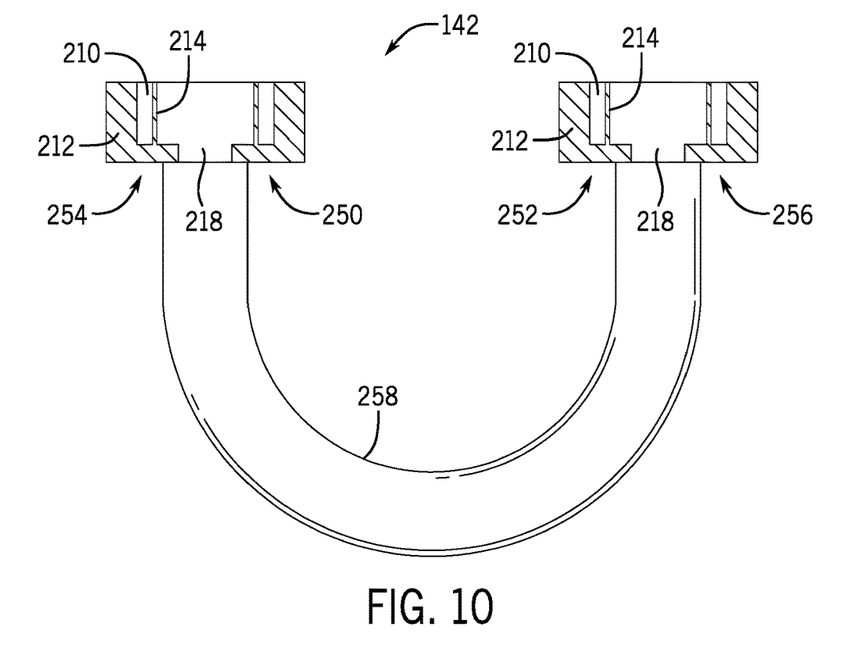
FIG. 10 is a cross-sectional view of an embodiment of a U-shaped connector assembly, in accordance with an aspect of the present disclosure.

FIG. 10 is a cross-sectional view of an embodiment of a U-shaped quick release connector assembly 142. The U-shaped quick release connector assembly 142 includes a first female connector 250 and a second female connector 252 that couple to opposing ends 254, 256 of the U-shaped conduit 258. The female connectors 250, 252 facilitate a quick connection and release from conduits 122 of the heat exchanger coil 120. When connected the female connector 250, 252 form a fluid tight seal with the conduits 122. This enables refrigerant to flow through the female connector 250, 252 and into the U-shaped conduit 258. Similar to the discussion above, the U-shaped conduit 258 may be made from a flexible material (e.g., rubber, plastic) capable of handling a refrigerant used in the heat exchanger coil 120. In some embodiments, the U-shaped conduit 258 may include the same material as the conduits 122 (e.g., copper, copper alloys, etc.) in order to better approximate actual operating conditions of the heat exchanger coil 120.

Figure 11:
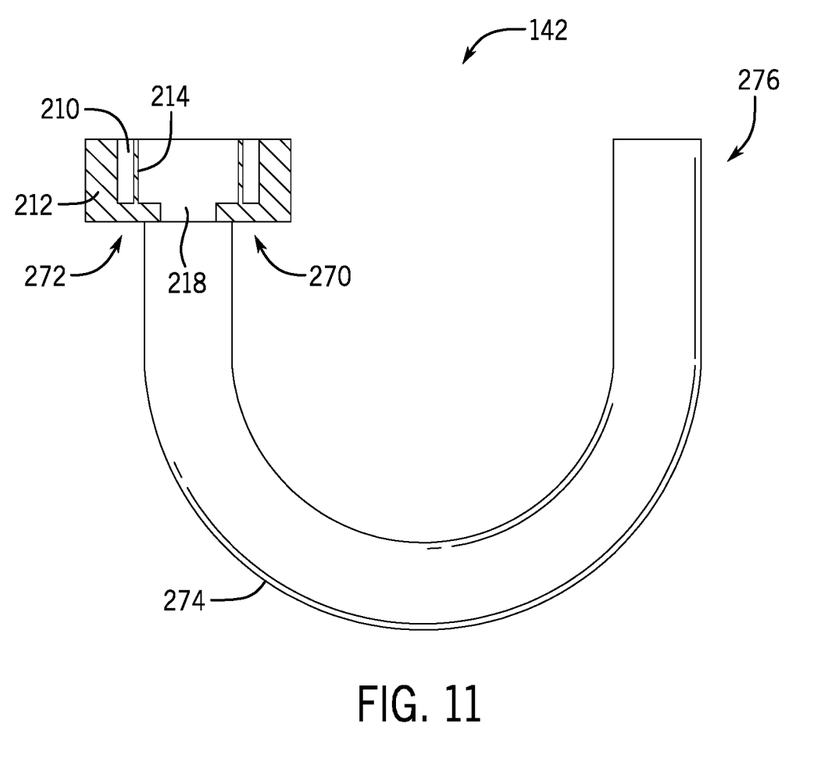
FIG. 11 is a cross-sectional view of an embodiment of a U-shaped connector assembly, in accordance with an aspect of the present disclosure.

FIG. 11 is a cross-sectional view of an embodiment of a U-shaped quick release connector assembly 142. As illustrated, the quick release connector assembly 142 includes a female connector 270 coupled to a first end 272 of a U-shaped conduit 274, while the second end 276 of the U-shaped conduit 274 does not. This enables the second end 276 of the quick release connector assembly 142 to connect to another female connector. For example, the second end 276 may couple to a female connector on a manifold, a conduit, etc. Similar to the discussion above, the U-shaped conduit 274 may be made from a flexible material, such as rubber or plastic, capable of handling a refrigerant used in the heat exchanger coil 120. In some embodiments, the U-shaped conduit 274 may made from the same material as the conduits 122, such as copper, copper alloys, etc., in order to better approximate actual operating conditions of the heat exchanger coil 120 during testing.

Figure 12:
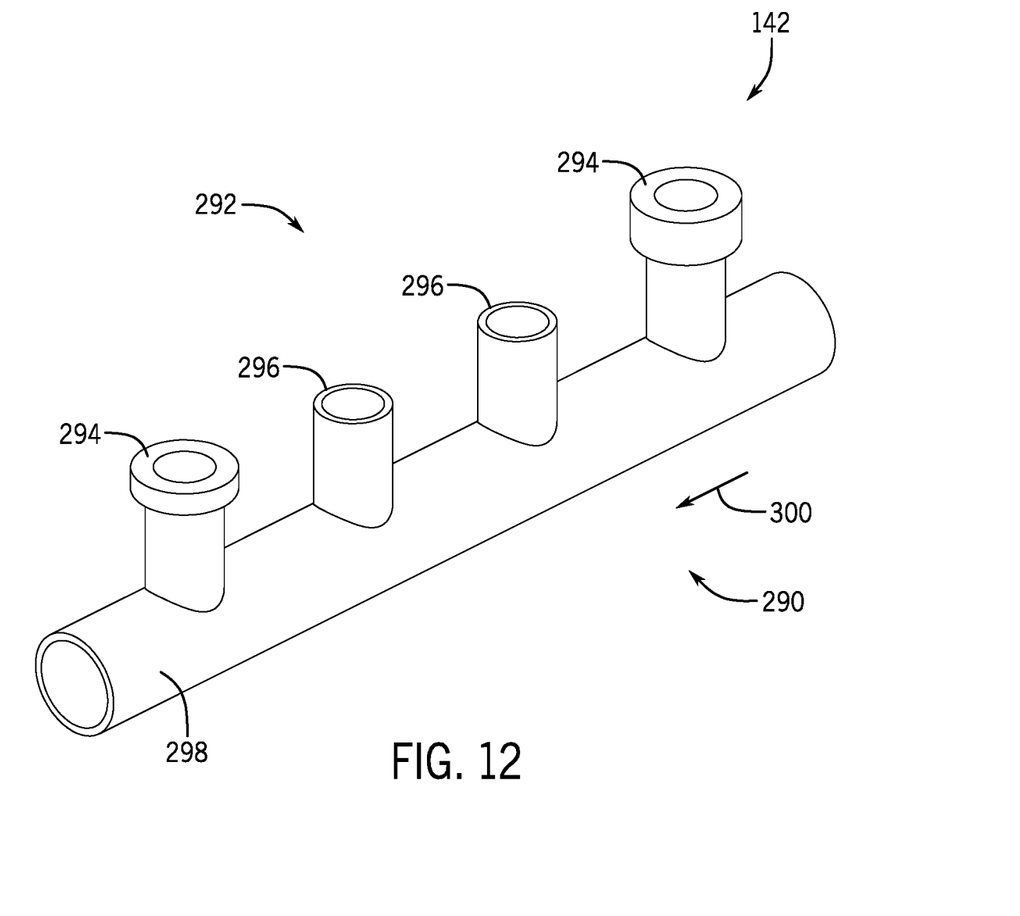
FIG. 12 is a perspective view of an embodiment of a manifold, in accordance with an aspect of the present disclosure.

FIG. 12 is a perspective view of an embodiment of the quick release connector assembly 142. As illustrated, the quick release connector assembly 142 includes a manifold 290. The manifold 290 includes a plurality of connectors 292, which may be quick release connectors. The plurality of connectors 292 includes both female connectors 294 and male connectors 296. However, in some embodiments the manifold 290 may have only female connectors 294 or only male connectors 296. The plurality of connectors 292 enable the manifold 290 to couple directly to conduits 122 and/or other quick release connector assemblies 142 in order to form a flow path(s) through the heat exchanger coil 120. As illustrated, the plurality of connectors 292 couple to the conduit 298. In some embodiments, the plurality of connectors 292 may be aligned with one another along the axis 300 of the conduit 298. In some embodiments, the plurality of connectors 292 may be spaced about the circumference of the conduit 298. In still other embodiments, some of the connectors 292 may be aligned with one another along the axis 300 while others are spaced about the circumference of the conduit 298.

Similar to the discussion above, the manifold 290 may be made from a flexible material, such as rubber or plastic, capable of handling a refrigerant used in the heat exchanger coil 120. In some embodiments, the manifold 290 may include the same material as the conduits 122, such as copper, copper alloys, etc., in order to better approximate actual operating conditions of the heat exchanger coil 120.

While only certain features and embodiments of the disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the disclosure, or those unrelated to enabling the claimed subject matter). It should be appreciated that in the development of any such actual implementation, as in any engineering or design project, numerous implementation specific decisions may be made. Such a development effort might be complex and time consuming, but would be a routine undertaking of design, fabrication, and manufacture for those of ordinary skill having the benefit of this disclosure, without undue experimentation.

The invention claimed is:

1. A heat exchanger coil prototyping system, comprising:
a heat exchanger coil, wherein the heat exchanger coil comprises:
a first conduit configured to carry a refrigerant, wherein the first conduit comprises a first open end and a second open end;
a second conduit configured to carry the refrigerant, wherein the second conduit comprises a third open end and a fourth open end;
a fin coupled to the first conduit and the second conduit;
a quick release connector system, wherein the quick release connector system comprises:
a first quick release connector assembly configured to couple to the first open end of the first conduit and to the third open end of the second conduit to route all the refrigerant flowing through the first conduit into the second conduit; and
a second quick release connector assembly configured to couple to the first conduit.

2. The system of claim 1, wherein the second quick release connector assembly is configured to couple to the second open end of the first conduit to connect the first conduit to a refrigerant source.

3. The system of claim 1, comprising a third quick release connector, wherein the third quick release connector is configured to couple to the fourth open end of the second conduit to guide refrigerant out of the heat exchanger coil.

4. The system of claim 1, wherein the first quick release connector assembly comprises a first female connector and a second female connector, wherein the first female connector couples to the first open end of the first conduit and the second female connector couples to the third open end of the second conduit.

5. The system of claim 4, wherein the first quick release connector assembly comprises a U-shaped conduit with a first end and a second end, wherein the first female connector couples to the first end of the U-shaped conduit and the second female connector couples to the second end of the U-shaped conduit.

6. The system of claim 5, wherein the U-shaped conduit comprises copper.

7. The system of claim 5, wherein the U-shaped conduit comprises a flexible material.

8. The system of claim 1, wherein the second quick release connector assembly comprises a manifold.

9. The system of claim 8, wherein the manifold comprises a plurality of female connectors.

10. The system of claim 8, wherein the second quick release connector assembly comprises a plurality of male connectors.

11. A heat exchanger coil prototyping system, comprising:
a heat exchanger coil, wherein the heat exchanger coil comprises:
a first conduit configured to carry a refrigerant, wherein the first conduit comprises a first end with a first quick release connector, and the first conduit is coupled to a fin;
a second conduit configured to carry the refrigerant, wherein the second conduit comprises a second quick release connector, and the second conduit is coupled to the fin; and
a third conduit configured to removably couple to the first quick release connector and the second quick release connector to create a refrigerant flow path between the first conduit and the second conduit.

12. The system of claim 11, wherein the first quick release connector is a female connector.

13. The system of claim 11, wherein the second quick release connector is a female connector.

14. The system of claim 11, wherein the first and second quick release connectors are brazed to the respective first and second conduits.

15. The system of claim 11, wherein the third conduit comprises copper.

16. The system of claim 11, wherein the third conduit comprises a flexible material.

17. A method of prototyping a heat exchanger coil, comprising:
providing a heat exchanger coil, wherein the heat exchanger coil comprises a first conduit and a second conduit, wherein the first and second conduits couple to a fin;
coupling a first quick release connector assembly to a first end of the first conduit of the heat exchanger coil;
coupling the first quick release connector assembly to a second end of the second conduit of the heat exchanger coil;
coupling a second quick release connector assembly to the first conduit of the heat exchanger coil;
decoupling the first quick release connector assembly from the second conduit of the heat exchanger coil; and
coupling the first quick release connector assembly to a third conduit of the heat exchanger coil to change a refrigerant flow path of the heat exchanger coil.

18. The method of claim 17, wherein the first quick release connector assembly comprises a first female connector and a second female connector, wherein the first female connector couples to the first end of the first conduit and the second female connector couples to the second end of the second conduit.

19. The method of claim 18, wherein the first quick release connector assembly comprises a U-shaped conduit wherein the first female connector and the second female connector couple to opposite ends of the U-shaped conduit.

20. The method of claim 17, wherein the second quick release connector assembly comprises a manifold.

21. The method of claim 20, wherein the manifold comprises a plurality of connectors.

* * * * *